United States Patent [19]
Hornsby

[11] Patent Number: 5,217,234
[45] Date of Patent: Jun. 8, 1993

[54] MECHANICAL SEAL WITH BARRIER FLUID CIRCULATION SYSTEM

[76] Inventor: John Hornsby, 5143 Sandy Ridge Dr., Baton Rouge, La. 70817

[21] Appl. No.: 673,724

[22] Filed: Mar. 22, 1991

[51] Int. Cl.[5] ............................................. F16J 15/34
[52] U.S. Cl. ........................................ 277/67; 277/15; 277/65; 277/18; 277/72 R; 277/74
[58] Field of Search .................... 277/15, 18, 65, 67, 277/68, 81 R, 93 R, 93 SD, 70, 71, 74, 72 R, 79

[56] References Cited

U.S. PATENT DOCUMENTS

| | | | |
|---|---|---|---|
| 2,226,001 | 12/1940 | La Bour | 277/15 |
| 2,534,530 | 12/1950 | Perry et al. | 277/63 |
| 3,356,378 | 12/1967 | Tracy | 277/81 R |
| 3,746,350 | 9/1973 | Mayer et al. | 277/15 X |
| 3,937,477 | 2/1976 | Gyory | 277/67 X |
| 3,968,969 | 7/1976 | Mayer et al. | 277/67 X |
| 4,466,619 | 8/1984 | Adams | 277/15 |
| 4,560,173 | 12/1985 | Adams et al. | 277/15 |
| 4,586,717 | 5/1986 | Sweeney | 277/15 |
| 4,685,684 | 8/1987 | Ballard | 277/68 X |
| 4,721,311 | 1/1988 | Kakabaker | 277/15 X |

FOREIGN PATENT DOCUMENTS 0654978  1/1963  Canada .............................. 277/67

Primary Examiner—William A. Cuchlinski, Jr.
Assistant Examiner—James K. Folker
Attorney, Agent, or Firm—Robert C. Tucker; William David Kiesel

[57] ABSTRACT

An improved mechanical seal is provided, wherein an annular inner flange extending from a gland plate having inlet and outlet openings is provided with a series of notches between the inlet and the outlet openings, the notches running in the direction of rotation of the shaft around which the seal is attached. The annular inner flange extends inwardly toward and close to the shaft. A series of axial notches made in the rotary sleeve of the seal, extending beneath the stationary seal assembly further increases pumping efficiency, and may be used to circulate barrier fluid without the notches in the flange. A recess in the flange at the outlet opening may used to further increase circulation efficiency.

56 Claims, 5 Drawing Sheets

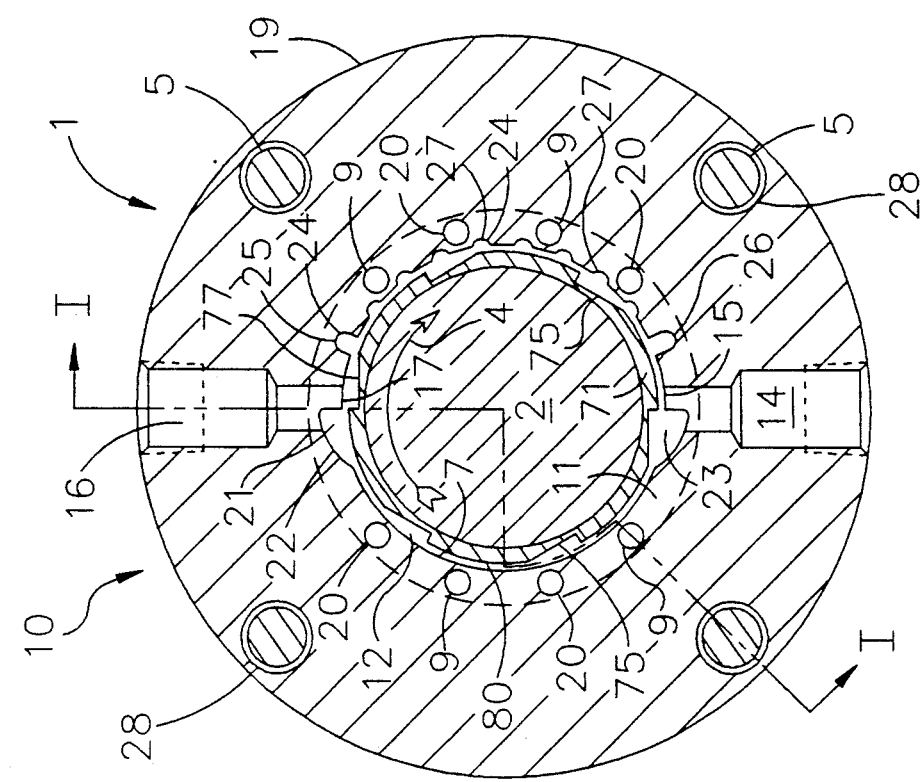
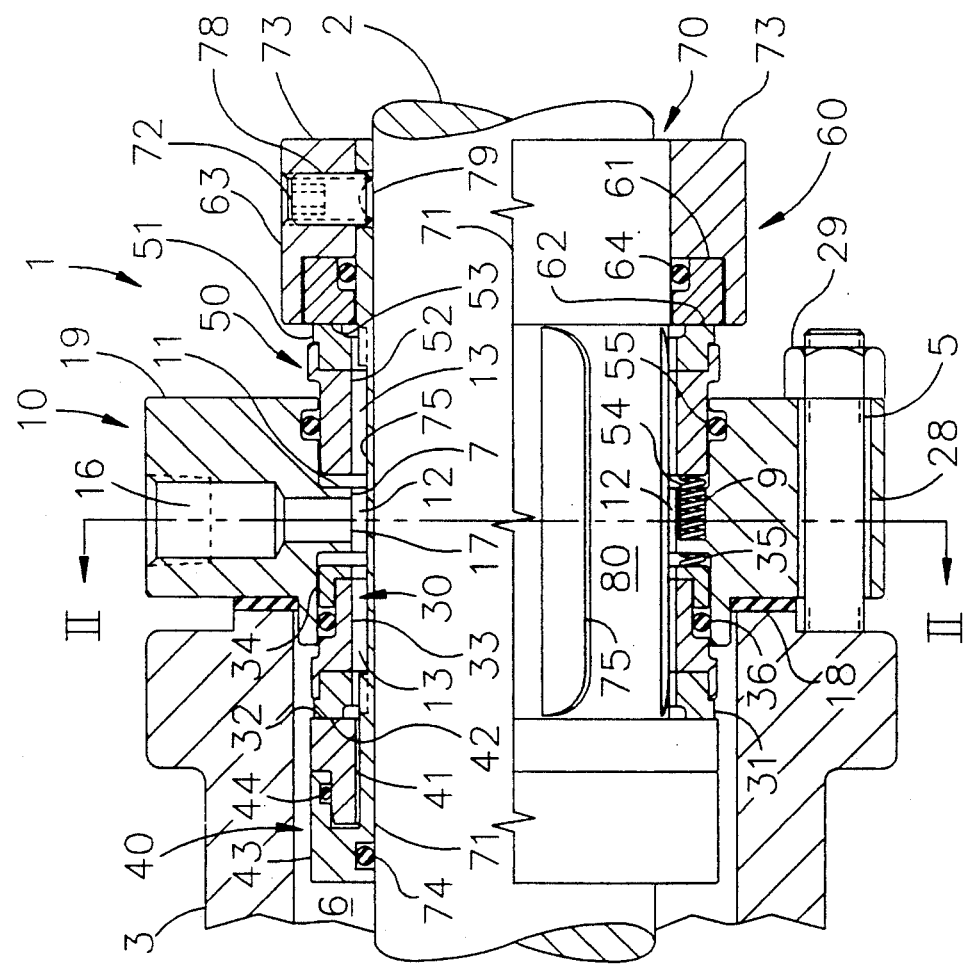
FIG. 2
FIG. 1

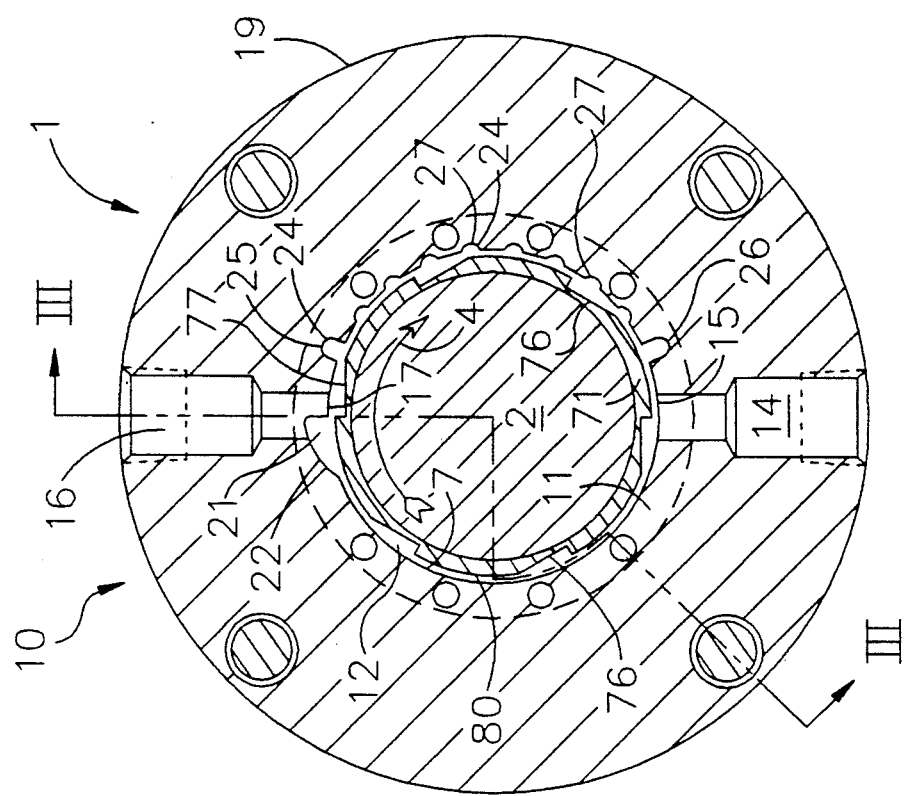
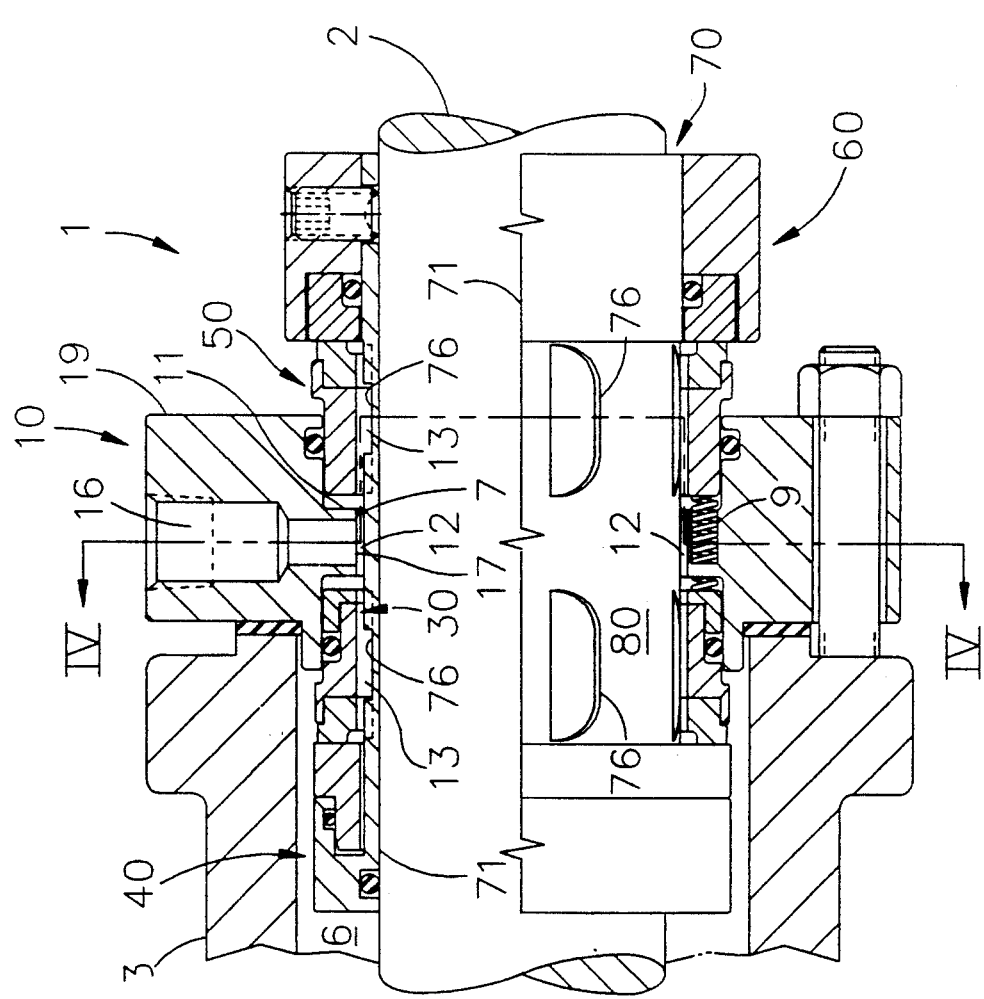
FIG. 4
FIG. 3

MECHANICAL SEAL WITH BARRIER FLUID CIRCULATION SYSTEM

BACKGROUND OF THE INVENTION

1. Field of the Invention

This invention relates generally to mechanical seals and, more specifically to cartridge mounted mechanical seals which circulate barrier fluid for cooling and lubrication purposes.

2. Prior Art

Mechanical seals are used to provide a seal between various components on a rotating shaft. Such seals take many different forms. In the field of cartridge mounted seals are mechanical seals which have at least one set of contacting seal faces, one rotary face and one stationary face, the rotary face being driven by its connection to a sleeve which is mounted nonrotatably to the shaft. The entire cartridge seal unit is installed by simply sliding the sleeve and the attached seal components onto the shaft and fixing the sleeve in place (usually with set screws). A gland plate is provided for supporting the stationary seal face. The gland plate is usually bolted to the housing (such as a pump housing) through which the shaft extends. If two sets of seal faces are provided on either side of the gland plate, the seal is known as a double or tandem seal.

In double or tandem seals, and in some specialized applications of single cartridge mounted seals, a barrier fluid is circulated through the seal during operation. Barrier fluid, such as a water-ethylene glycol mix, enters and exits through the gland plate. The fluid circulating within the seal provides lubrication for the sealing faces as well as coolant for the seal. The barrier fluid also can help absorb vapor leakage of process fluids, protecting the environment. In a double seal the pressure is greater in the seal than in the process stream. In a tandem seal the pressure of the process stream is greater than in the seal. Due to space limitations, maintenance problems and other site specific requirements, a separate device (such as a pump) for circulating the fluid through the seal is not desirable. Prior art means for providing barrier fluid include simply connecting the inlet and outlet to a barrier fluid reservoir, allowing convection currents to provide some circulation for the fluid. In such systems the seals may experience early failure due to lack of lubrication and extensive heat damage. Another system utilized to circulate barrier fluid involves flowing the barrier fluid into the seal cavity and then expelling it to a drain. This process is wasteful of barrier fluid and also presents environmental disposal problems.

Various devices have been designed to utilize the rotation of the shaft to induce a pumping action from within the seal to circulate the barrier fluid. In some mechanical seals an impeller has been added to the interior design of the seal for circulation of barrier fluid. The addition of an impeller is not possible in many cartridge designs as it results in too much bulk in the seal, increasing the overall size of the seal and prohibiting installation of the device in many applications requiring very small seal components.

U.S. Pat. Nos. 4,466,619 and 4,560,173 disclose other attempts to provide a circulation means without adding and impeller-type device to the shaft or the shaft sleeve. U.S. Pat. No. 4,466,619, invented by William V. Adams, describes a pumping device which includes inlet and outlet passages bored through the seal stator and oriented tangentially to the shaft sleeve in order to encourage liquid flow. A pumping rotor is formed on the sleeve by cutting radial rectangular grooves in the sleeve to aid in moving the barrier fluid through the seal. The use of tangential bores often requires a relocation of the inlet and outlet points on the gland. Such relocation may prohibit installation of the seal in applications where there is limited access to the gland for attachment of circulation piping. A large number of installation sites have access to the gland limited to the top and bottom of the seal. Also, tangential boring of the stator and/or the gland is adds expense to the seal manufacturing process. Further, the use of rectangular pumping grooves greatly weakens the shaft sleeve, which has a very thin cross section in many seals. In order to combat the reduced sleeve strength it is necessary to thicken the sleeve cross section, again adding unwanted bulk to the overall seal construction, making installation difficult or impossible in many situations. The location of the pumping grooves directly beneath the stator in the center of the seal does not encourage circulation of barrier fluid to all of the interior seal components, reducing the effectiveness of the device.

U.S. Pat. No. 4,560,173, invented by William V. Adams and Duane A. Avard, attempts to further advance the art of barrier fluid circulation. This patent eliminates the pumping grooves from the shaft sleeve and utilizes an obstruction extending inward from the gland between the inlet and outlet to encourage fluid flow, induced by the rotating shaft. While this improvement eliminates the rectangular pumping grooves, other problems are created. Many cartridge mounted seals utilize an annular flange extending inward from the gland on which to mount various seal components, which are connected to the seal stator. It is preferred in many applications to provide springs or other resilient means between the flange and the stator to allow the stator to adjust to misalignment of the seal and to provide maximum contact between the stator(s) and rotor(s). Since the obstruction of Adams et al. does not extend fully around the shaft sleeve there is no place to install springs or other seal components. Adams et al. is thus limited to designs in which the rotor is resiliently mounted rather than the stator. Such seals do not perform the sealing function when misaligned as well as seals which incorporate self-adjusting stators.

Both of the patented devices described above have also exhibited a limited ability to adequately circulate the barrier fluid. There is an increased concern by those in the mechanical seal industry in circulating barrier fluid at a greater flow rate to all internal seal components, thus making the seals function more efficiently and for a longer period of time.

SUMMARY OF THE INVENTION

Accordingly, it is an object of this invention to provide a mechanical seal with a barrier fluid circulation system which utilizes the dynamics of the rotating shaft to circulate barrier fluid at a greater flow rate.

It is another object of this invention to provide a mechanical seal with a barrier fluid circulation system which more efficiently circulates barrier fluid within the seal.

It is still another object of this invention to provide a mechanical seal with a barrier fluid circulation system which accomplishes some or all of the above objectives and does not increase overall seal size.

It is a further object of this invention to provide a mechanical seal with a barrier fluid circulation system which accomplishes some or all the above objectives while maintaining an annular inner flange on the gland on which seal components can be mounted.

Therefore, an improved mechanical seal is provided, wherein an annular inner flange extending from a gland having inlet and outlet openings is provided with a series of notches between the inlet and the outlet openings, the notches running in the direction of rotation of the shaft around which the seal is attached. The annular inner flange extends inwardly toward and close to the shaft. A series of axial notches made in the rotary sleeve of the seal, extending beneath the stationary seal assembly further increases pumping efficiency, and may be used to circulate barrier fluid without the notches in the flange. A recess in the flange at the outlet opening may used to further increase circulation efficiency.

BRIEF DESCRIPTION OF THE DRAWINGS

FIG. 1 is a sectional side view of an embodiment of the invention taken along section line I—I of FIGS. 2, 7, 8, 9 or 10.

FIG. 2 is a sectional end view of an embodiment of the invention taken along section line II—II of FIG. 1.

FIG. 3 is a sectional side view of an embodiment of the invention taken along section line III—III of FIG. 4.

FIG. 4 is a sectional end view of an embodiment of the invention taken along section line IV—IV of FIG. 3.

DETAILED DESCRIPTION OF PREFERRED EMBODIMENTS OF THE INVENTION

Figure 6:
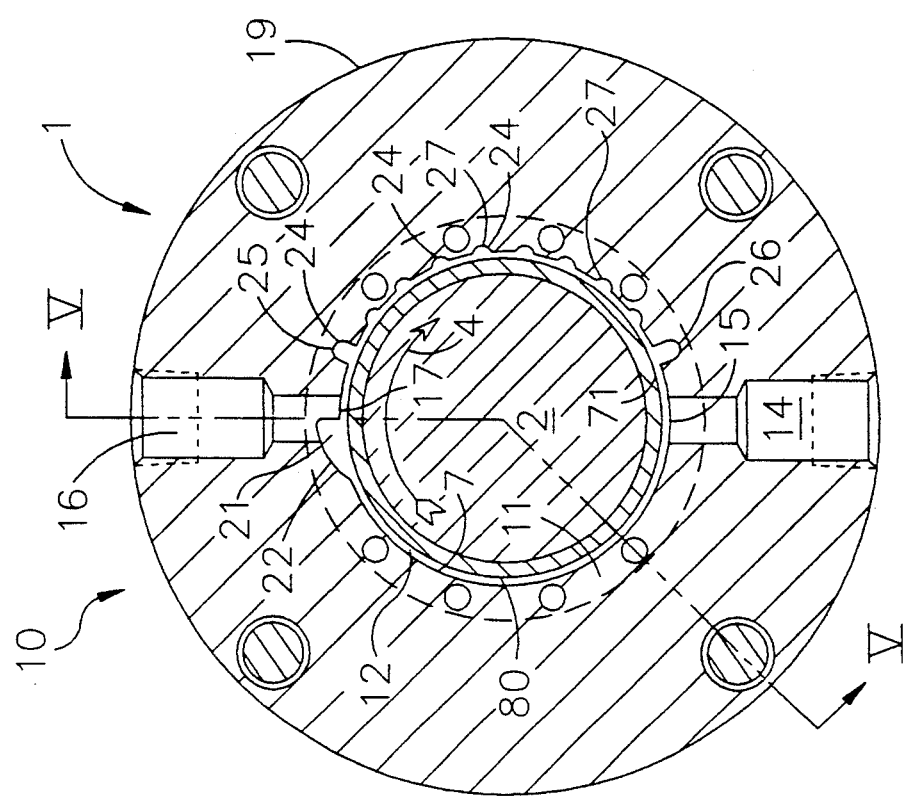
FIG. 6 is a sectional end view of an embodiment of the invention taken along section line VI—VI of FIG. 5.

As shown in FIGS. 1 and 2, the mechanical seal 1 of the invention provides a seal around a rotatable shaft 2 within a housing 3. The seal 1 is attached to housing 3 via gland studs 5, and is attached to shaft 2 utilizing set screws 72, which attach rotary sleeve assembly 70 to shaft 2. For purposes of this application, rotation of shaft 2 will be clockwise, as shown by rotation arrow 4. The seal 1 shown in the Figures will operate as a double or a tandem seal. It should be understood that the barrier fluid circulation system described herein will function in applications requiring only a single set of seal faces. For example, in the embodiment shown in FIG. 1, the set of inboard stationary and rotary seal members 31,41 could be removed so long as the cavity 6 within housing 3 is sealed so as to allow fluid circulation. The following discussion will center around a double or tandem seal application, but in no way is intended to limit the scope of the invention to such applications.

The seal 1 includes a gland means 10, such as a gland plate 19 or other constructions known in the art, which is nonrotatably attachable to housing 3 in a surrounding relationship to shaft 3. Gland plate 19 is provided with an inlet passageway 14, leading to an inlet opening 15, and an outlet passageway 16, leading to an outlet opening 17. Inlet passageway 14 and outlet passageway 15 are norm: ally connected via conduit (not shown) to a barrier fluid reservoir (not shown). Barrier fluid is thus recirculated through the seal 1, entering cavity 13 within the seal 1 through inlet opening 15 and exiting through outlet opening 17. An annular inner flange 11 is provided on gland plate 19, extending inward toward shaft 2. Inner flange 11 is provided with n annular inner surface 7 which forms an annular space 12 around shaft 2. Inlet opening 15 and outlet opening 17 emerge from inner flange 11 at inner surface 7. Gland plate 19 is fixed to housing 3 with gland studs 5 extending through gland stud holes 28 and secured by gland stud nuts 29. Gasket 18 provides a seal between housing 3 and gland plate 19.

Inboard annular stationary seal means 30 and outboard annular stationary seal means 50 are positionable around shaft 2, axially. adjacent to inner flange 11 and in a nonrotatable relationship with respect to housing 3. Inner flange 11 supports inboard annular stationary seal means 30 via inboard spring holes 20, bored partially into inner flange 11. Inboard springs 35 are seated in inboard spring holes 20. Inboard springs bear against inboard stationary seal means 30, which includes inboard compression ring 34, stationary seal member holder 33 and inboard stationary seal member 31 having an inboard stationary seal face 32. Likewise, inner flange 11 supports outboard annular stationary seal means 50 via outboard spring holes 9, bored partially into inner· flange 11. Outboard springs 54 bear against outboard stationary seal means 50, which includes outboard stationary seal member holder 52 and outboard stationary seal member 51 having an outboard stationary seal face 53. Section line II—II cuts through both inboard spring holes 20 and outboard spring holes 9, as shown in FIG. 2. Springs 35,54 provide a means for self-adjustment of stationary seal faces 32,53, compensating for misalignment during installation of the seal 1. O-ring 36 provides a seal for inboard stationary seal holder 33, and O-ring 55 provides a seal for outboard stationary seal holder 52.

Both inboard annular rotary seal means 40 and outboard annular rotary seal means 60 are nonrotatably connected to rotary sleeve assembly 70, which is nonrotatably attachable around shaft 2. As shown in FIG. 1, inboard annular rotary seal means 40 includes inboard rotary seal member 41, having an inboard rotary seal face 42, and inboard rotary seal member holder flange 43. Holder flange 43 holds inboard rotary seal member 41 in place on rotary sleeve assembly 70. O-ring 44 provides a seal between holder flange 43 and inboard rotary seal member 41. Inboard rotary seal face 42 is slidably and sealingly engageable with inboard stationary seal face 32, providing an inboard seal between housing cavity 6 and seal cavity 13. If the barrier fluid pressure within seal cavity 13 is greater than that of the fluid in cavity 6, the seal 1 is acting as a double seal, and the inboard sealing faces 42,32 are lubricated by the barrier fluid. If the barrier fluid pressure within seal cavity 13 is less than that of the fluid in housing cavity 6, the seal 1 is acting as a tandem seal, and the inboard sealing faces 42,32 are lubricated by the fluid within housing cavity 6.

Outboard annular rotary seal means 60 includes outboard rotary seal member 61, having an outboard rotary seal face 62, and outboard rotary seal member holder flange 63. Holder flange 63 holds outboard rotary seal member 61 in place on rotary sleeve assembly 70. O-ring 64 provides a seal between holder flange 63 and outboard rotary seal member 61. Outboard rotary seal face 62 is slidably and sealingly engageable with outboard stationary seal face 53, providing an outboard seal between the atmosphere and seal cavity 13. Barrier fluid within seal cavity 13 lubricates outboard sealing faces 53,62.

Rotary sleeve assembly 70 drives the rotary seal faces 42,62 and provides a means for attachment of the seal 1 to the shaft 2. Rotary sleeve assembly 70 also provides a mean for holding the various parts of the seal together as a unit, or cartridge, simplifying seal installation and alignment. Rotary sleeve 71 is nonrotatably attached around shaft 2 by set screws 72 or other means known in the art. As shown, set screws 72 pass through set screw holes 78,79 in lock collar 73 and rotary sleeve 71, respectively. O-ring 74 provides a seal between sleeve 71 and shaft 2. In installation, sleeve assembly 70, on which is mounted all of the various parts described above, slides onto shaft 2 until gland means 10 abuts housing 3. Gland stud nuts 29 and set screws 72 are then tightened. Piping from a barrier fluid source, such as a reservoir, is then connected to inlet passageway 14 and outlet passageway 16, and the seal 1 is ready for operation.

In many mechanical seal applications it is vital that the barrier fluid circulate throughout seal cavity 13 in order to prolong the life of the seal 1. However, it is also critical that the compactness of the cartridge seal 1 be maintained in order for the seal to fit into a standardized location on housing 3. Further, it is desirable that inner flange 11 remain substantially intact for its full circumference around rotary sleeve 71, in order to maintain support for elements of inboard and outboard stationary seal means 40,60, such as inboard and outboard springs 35,54. It has been found that various combinations of notches and recesses, located on the outer surface 80 of sleeve 71 and on the annular inner surface 7 of flange 11 will produce an excellent pumping action for circulating barrier fluid throughout the seal cavity 13 while maintaining the standard size of the seal 1 as well as the structural integrity of flange 11.

In the embodiments shown in FIGS. 1 and 2, a plurality of notches 24 are provided in flange 11, extending radially outward from inner surface 7 and located between outlet opening 17 and inlet opening 15 in the direction of rotation 4 of shaft 2. It is believed that notches 24 cause turbulence and back pressure in the barrier fluid within annular space 12 in the area of the notches 24, thus, coupled with the frictional drive of the rotating sleeve 71, encouraging flow between inlet opening 15 and outlet opening 17. It has been found that providing a deeper notch 25 substantially adjacent to outlet opening 17 and a deeper notch 26 substantially adjacent to inlet opening 15 increases the flow rate of the barrier fluid. Interior notches 27 of lesser depth, spaced between notches 25 and 26 further increase the flow rate. Experiments with varying notch locations and depths have shown that a spacing of approximately fifteen degrees between the centers of notches 2 yields excellent barrier fluid circulation. Experiments also indicate that a preferable depth of interior notches 27 should be approximately equal to the perpendicular distance between inner surface 7 of flange 11 and outer surface 80 of sleeve 71. The depth of notch 25 should be approximately three times the depth of interior notches 27, and the depth of notch 26 should be approximately five times the depth of interior notches 27. As shown in FIG. 2, notches 24 do not interfere with spring holes 9,20 while providing sufficient back pressure and turbulence to increase the flow rate and circulation of barrier fluid.

To further increase barrier fluid circulation within seal cavity 13 as well as the overall flow rate, a plurality of axial notches 75 are provided in the outer surface 80 of rotary sleeve 71. Axial notches 75 run from beneath inboard stationary seal member 31 through annular space 12 to beneath outboard stationary seal member 51. The extended length of notches 75 encourages the bathing of internal seal components with barrier fluid as well as increased flow rate. It is preferred that each axial notch 7 have a sloping bottom 77, sloping from the maximum depth of the notch to outer surface 80 of sleeve 71. It is also preferable that the slope from the maximum depth of notch 75 to outer surface 80 of sleeve 71 be in the direction of rotation 4, as shown in FIG. 2. However, a slope in the direction opposite to the direction of rotation 4 will also yield good results. The maximum depth of axial notches 75 depends upon the thickness of sleeve 71. As the depth of notch 75 increases, so does the pumping efficiency of the notch 75. Care should be taken not to cut notch 75 so deep as to substantially weaken the sleeve 71. It has been found that a maximum depth of notch 75 approximately equal to the perpendicular distance between flange 11 and sleeve 71 will produce good results. The sloping bottom 77 of axial notches 75 reduces the amount of material removed from sleeve 71 to form the notches 75, thus decreasing the damage to sleeve 71 and increasing the barrier fluid flow rate. It is preferable that axial notches 75 be spaced equally about sleeve 71 to maintain a balance in seal 1 during operation.

A further increase in circulation efficiency may be obtained by providing a recess 21 in annular inner surface 7 at the intersection of inner surface 7 with outlet opening 17. It is preferable that recess 21 include a sloped surface 22, sloping from annular inner surface 7 to outlet opening 17, as shown in FIG. 2. Recess 21 encourages barrier fluid flow through outlet opening 17. A similar recess 23 may be provided at the intersection of inner surface 7 with inlet opening 15 to encourage flow from inlet opening 15.

Figure 5:
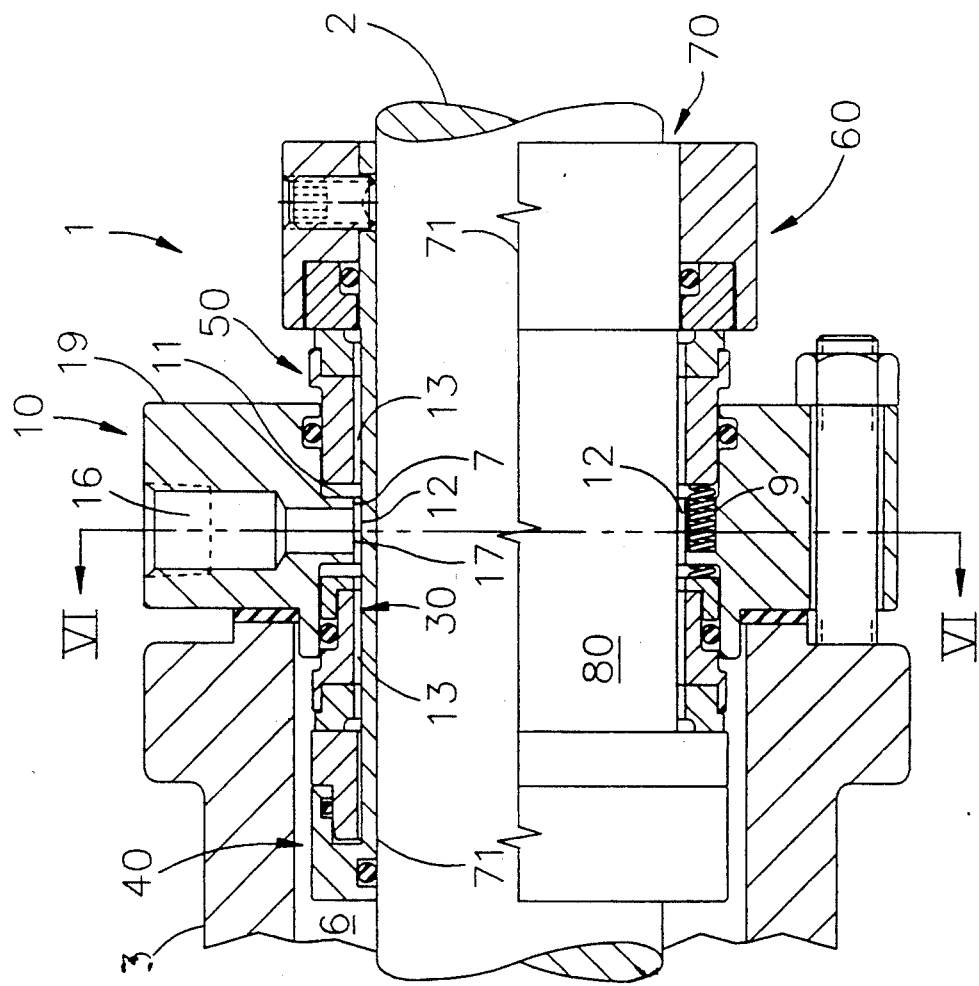
FIG. 5 is a sectional side view of an embodiment of the invention taken along section line V—V of FIG. 6.
Figure 8:
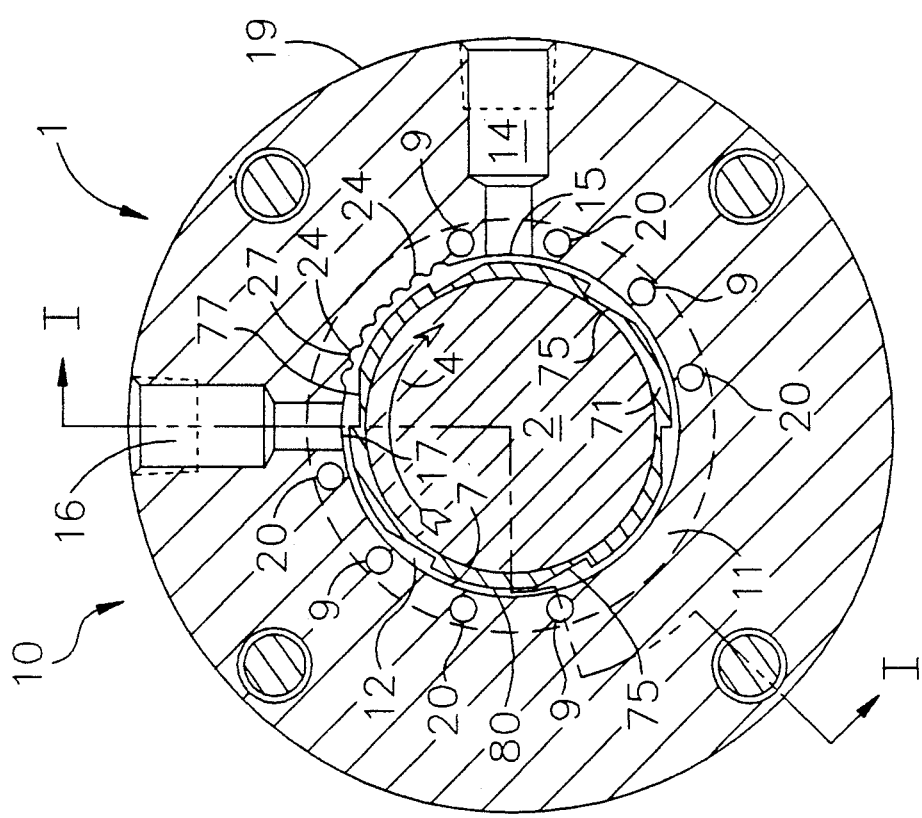
FIG. 8 is a sectional end view of an alternate embodiment of the invention taken along section line II—II of FIG. 1 or IV—IV of FIG. 3.
Figure 7:
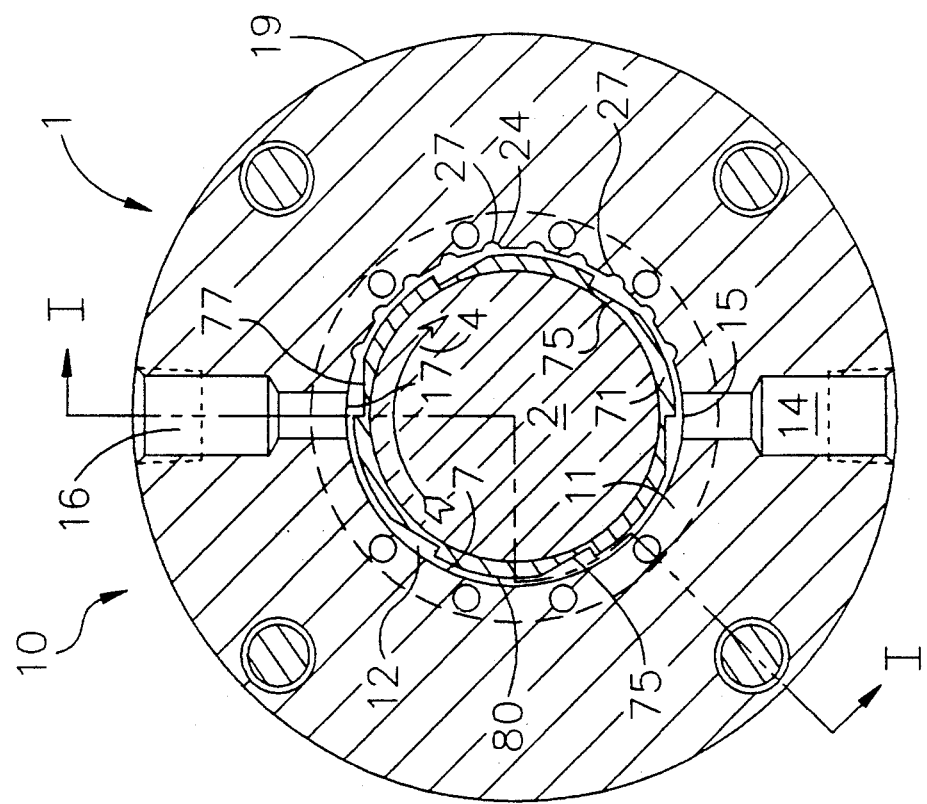
FIG. 7 is a sectional end view of an alternate embodiment of the invention taken along section line II—II of FIG. 1 or IV—IV of FIG. 3.
Figure 10:
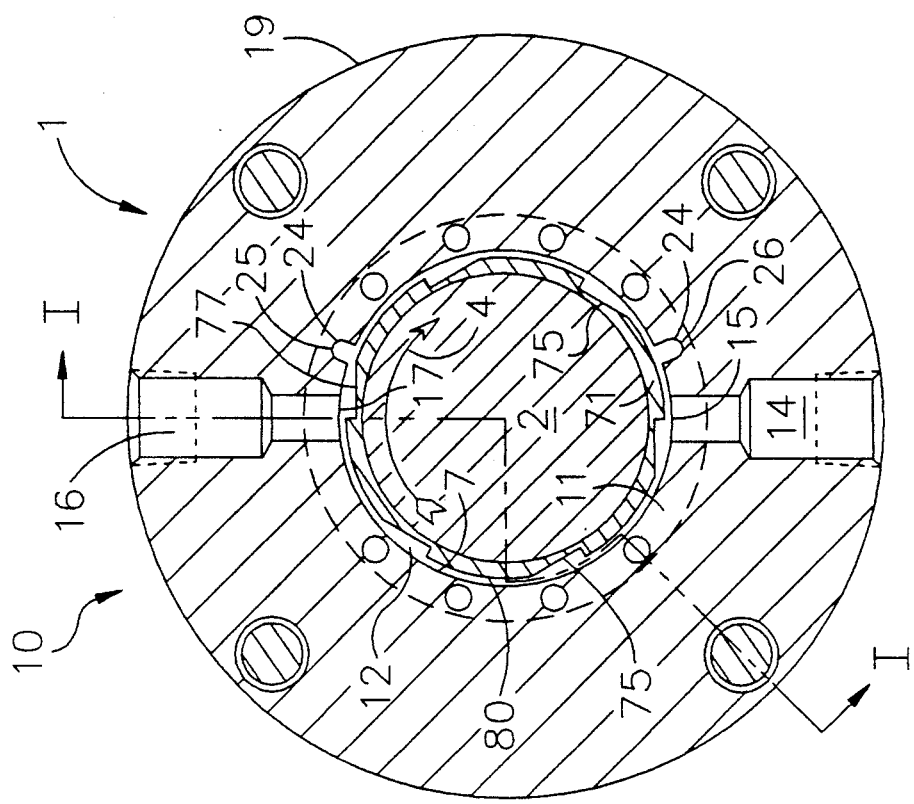
FIG. 10 is a sectional end view of an alternate embodiment of the invention taken along section line II—II of FIG. 1 or IV—IV of FIG. 3.
Figure 9:
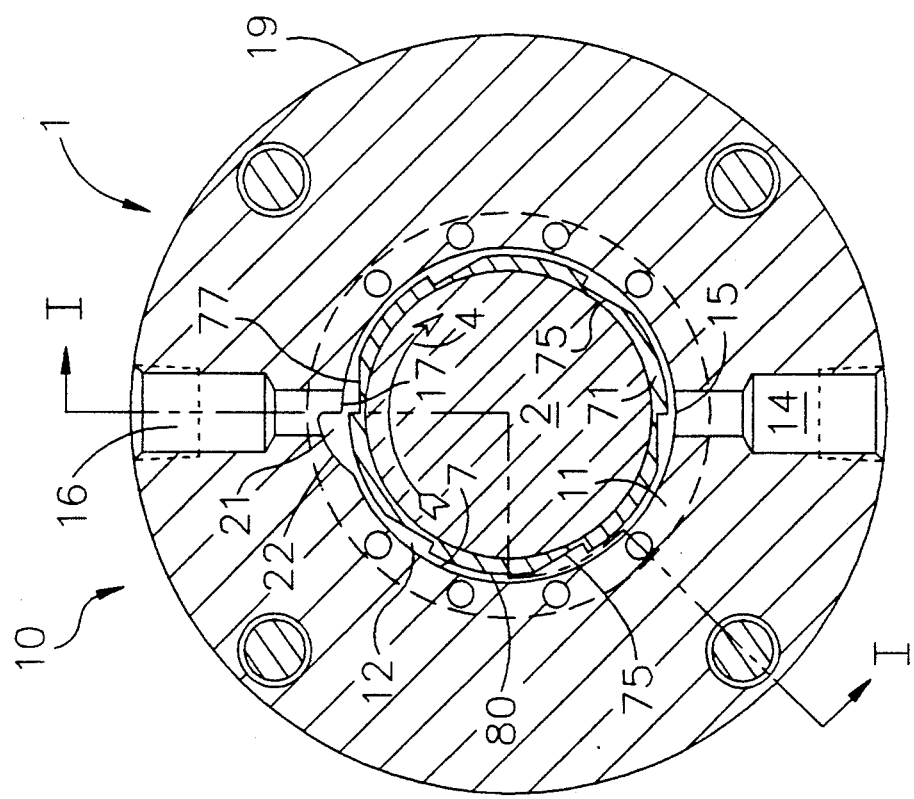
FIG. 9 is a sectional end view of an alternate embodiment of the invention taken along section line II—II of FIG. 1 or IV—IV of FIG. 3.

Various other embodiments of the invention 1 are shown in FIGS. 3-10. In FIGS. 3-4, axial notches 76 are shown; positioned beneath stationary seal means 30,50, but not beneath flange 11. In applications where circulation to sealing faces is critical, it may prove advantageous to utilize this embodiment, which should tend to draw barrier fluid from the central area of seal cavity 13 and distribute fluid to stationary seal members 31,51. FIGS. 5 and 6 show an embodiment of the seal 1 with notches 24 in flange 11, but with no notches 75 or 76 in sleeve 71. This embodiment will circulate barrier fluid adequately in situations where it is not desirable to cut notches 75,76 in sleeve 71. Inlet recess 23 has also been eliminated in this embodiment. FIG. 7 illustrates an embodiment wherein both recesses 21,23 have been eliminated along with notches 25 and 26. In FIG. 8, inlet opening 15 and outlet opening 17 have been moved closer together, and the distance between notches 27 has been compressed, allowing installation of the seal 1 in locations wherein inlet opening 15 and outlet opening 17 are spaced ninety degrees apart rather than one hundred eighty degrees apart. FIG. 9 illustrates an embodiment wherein all notches 24 have been eliminated. In FIG. 10, only notches 25 and 26 are used on flange 11.

In all of the various embodiments shown in the Figures, the seal 1 will adequately circulate barrier fluid. Various other combinations of these embodiments of the invention will also function well in particular applications. By utilizing the various means for circulating barrier fluid, a seal 1 can be fine tuned for particular installation requirements and conditions while maintaining a standard overall seal size. Other embodiments of the invention will occur to those skilled in the art, and are intended to be included within the scope and spirit of the following claims.

I claim:

1. In a mechanical seal for providing a seal between a housing and a shaft rotatable in a direction of rotation, said mechanical seal including:
   a. a gland means, nonrotatably attachable to said housing in a surrounding relationship to said shaft and having an annular inner flange extending radially inward toward said shaft, forming an annular space around said shaft, said inner flange having an annular inner surface facing said shaft, said gland means and said annular inner flange to said annular space at an intersection with said annular inner surface, and an outlet opening extending through said gland means and said annular inner flange to said annular space at an intersection with said annular inner surface;
   b. an annular stationary seal means having a stationary seal face, said stationary seal means positionable around said shaft axially adjacent to and axially supported by said inner flange and in a nonrotatable relationship with respect to said housing;
   c. an annular rotary seal means having a rotary seal face slidably and sealingly engageable with said stationary seal face, said rotary seal means nonrotatably connected to a rotary sleeve; and
   d. a rotary sleeve having an outer surface, nonrotatably attachable around said shaft and extending between said rotary seal face and said shaft, between said stationary seal face and said shaft, and through said annular space;

an improvement wherein said annular flange is provided with a plurality of notches having centers and extending radially outward from said inner surface, said notches being circumferentially spaced on that portion of said flange beginning at said outlet opening, continuing in said direction of rotation of said shaft, and ending at said inlet opening.

2. A mechanical seal according to claim 1, wherein one said notch is located substantially adjacent to said outlet opening and another said notch is located substantially adjacent to said inlet opening.

3. A mechanical seal according to claim 2, wherein a plurality of interior notches are provided between said notch adjacent to said outlet opening and said notch adjacent to said inlet opening.

4. A mechanical seal according to claim 3, wherein said notch adjacent to said outlet opening has a depth approximately equal to three times a perpendicular distance between said flange and said sleeve, and said notch adjacent to said inlet opening has a depth approximately equal to five times said distance between said flange and said sleeve.

5. A mechanical seal according to claim 4, wherein said interior notches each have a depth approximately equal to said perpendicular distance between said flange and said sleeve.

6. A mechanical seal according to claim 3, wherein said notches are provided in a number such that said centers of said notches are spaced approximately fifteen degrees apart between said inlet opening and said outlet opening.

7. A mechanical seal according to claim 1, wherein said sleeve is provided with a plurality of axial notches each extending from beneath said flange to beneath said stationary seal means.

8. A mechanical seal according to claim 7, wherein each said axial notch is provided with a sloping bottom, sloping from a desired maximum depth of said notch radially outward to said outer surface of said sleeve.

9. A mechanical seal according to claim 8, wherein said bottom slopes from said desired maximum depth of said notch to said outer surface of said sleeve in said direction of rotation of said shaft.

10. A mechanical seal according to claim 3, wherein said sleeve is provided with a plurality of axial notches each extending from beneath said flange to beneath said stationary seal means.

11. A mechanical seal according to claim 10, wherein each said axial notch is provided with a sloping bottom, sloping from a desired maximum depth of said notch radially outward to said outer surface of said sleeve.

12. A mechanical seal according to claim 11, wherein said bottom slopes from said desired maximum depth of said notch to said outer surface of said sleeve in said direction of rotation of said shaft.

13. A mechanical seal according to claim 1, wherein said sleeve is provided with a plurality of axial notches, each positioned between said stationary seal means and said shaft.

14. A mechanical seal according to claim 13, wherein each said axial notch is provided with a sloping bottom, sloping from a desired maximum depth of said notch radially outward to said outer surface of said sleeve.

15. A mechanical seal according to claim 14, wherein said bottom slopes from said desired maximum depth of said notch to said outer surface of said sleeve in said direction of rotation of said shaft.

16. A mechanical seal according to claim 1, wherein a recess is provided in said annular inner surface at said intersection of said annular inner surface and said outlet opening, said recess extending from said outlet opening in a direction opposite said direction of rotation.

17. A mechanical seal according to claim 16, wherein said recess includes a sloped surface sloping from said annular inner surface to said outlet opening in said direction of rotation of said shaft.

18. A mechanical seal according to claim 16, wherein a recess is provided in said annular inner surface at said intersection of said annular inner surface and said inlet opening, said recess in said annular inner surface at said intersection of said annular inner surface and said inlet opening extending from said inlet opening in said direction of rotation.

19. In a mechanical seal for providing a seal between a housing and a shaft rotatable in a direction of rotation, said mechanical seal including:
   a. a gland means, nonrotatably attachable to said housing in a surrounding relationship to said shaft and having an annular inner flange extending radially inward toward said shaft, forming an annular space around said shaft, said inner flange having an annular inner surface facing said shaft, said gland means further having an inlet opening extending through said gland means and said annular inner flange to said annular space at an intersection with said annular inner surface, and an outlet opening extending through said gland means and said annular inner flange to said annular space at an intersection with said annular inner surface;

b. an annular stationary seal means having a stationary seal face, said stationary seal means positionable around said shaft axially adjacent to and axially supported by said inner flange and in a nonrotatable relationship with respect to said housing;

c. an annular rotary seal means having a rotary seal face slidably and sealingly engageable with said stationary seal face, said rotary seal means nonrotatably connected to a rotary sleeve; and d. a rotary sleeve having an outer surface, nonrotatably attachable around said shaft and extending between said rotary seal face and said shaft, between said stationary seal face and said shaft, and through said annular space;

an improvement wherein said annular flange is provided with a plurality of axial notches, each positioned between said stationary seal means and said shaft, wherein each said axial notch is provided with a sloping bottom, sloping from a desired maximum depth of said notch radially outward to said outer surface of said sleeve, and wherein said bottom slopes from said desired maximum depth of said notch to said outer surface of said sleeve in said direction of rotation of said shaft.

20. In a mechanical seal for providing a seal between a housing and a shaft rotatable in a direction of rotation, said mechanical seal including:

a. a gland means, nonrotatably attachable to said housing in a surrounding relationship to said shaft and having an annular inner flange extending radially inward toward said shaft, forming an annular space around said shaft, said inner flange having an annular inner surface facing said shaft, said gland means further having an inlet opening extending through said gland means and said annular inner flange to said annular space at an intersection with said annular inner surface, and an outlet opening extending through said gland means and said annular inner flange to said annular space at an intersection with said annular inner surface;

b. an annular stationary seal means having a stationary seal face, said stationary seal means positionable around said shaft axially adjacent to and axially supported by said inner flange and in a nonrotatable relationship with respect to said housing;

c. an annular rotary seal means having a rotary seal face slidably and sealingly engageable with said stationary seal face, said rotary seal means nonrotatably connected to a rotary sleeve; and d. a rotary sleeve having an outer surface, nonrotatably attachable around said shaft and extending between said rotary seal face and said shaft, between said stationary seal face and said shaft, and through said annular space;

an improvement wherein said sleeve is provided with a plurality of axial notches, each positioned between said stationary seal means and said shaft, and wherein a recess is provided in said annular inner surface at said intersection of said annular inner surface and said outlet opening, said recess extending from said outlet opening in a direction opposite said direction of rotation.

21. A mechanical seal according to claim 20, wherein said recess includes a sloped surface sloping from said annular inner surface to said outlet opening in said direction of rotation of said shaft.

22. A mechanical seal according to claim 21, wherein a recess is provided in said annular inner surface at said intersection of said annular inner surface and said inlet opening, said recess in said annular inner surface at said intersection of said annular inner surface and said inlet opening extending from said inlet opening in said direction of rotation.

23. A mechanical seal according to claim 20, wherein said axial notches each extend from beneath said stationary seal means to beneath said flange.

24. A mechanical seal according to claim 23 wherein each said axial notch is provided with a sloping bottom, sloping from a desired maximum depth of said notch radially outward to said outer surface of said sleeve.

25. A mechanical seal according to claim 24, wherein said bottom slopes from said desired maximum depth of said notch to said outer surface of said sleeve in said direction of rotation of said shaft.

26. A mechanical seal according to claim 25, wherein a recess is provided in said annular inner surface at said intersection of said annular inner surface and said outlet opening, said recess extending from said outlet opening in a direction opposite said direction of rotation.

27. A mechanical seal according to claim 26, wherein said recess includes a sloped surface sloping from said annular inner surface to said outlet opening in said direction of rotation of said shaft.

28. A mechanical seal according to claim 26, wherein a recess is provided in said annular inner surface at said intersection of said annular inner surface and said inlet opening, said recess in said annular inner surface at said intersection of said annular surface and said inlet opening extending from said inlet opening in said direction of rotation.

29. In a mechanical seal for providing a seal between a housing and a shaft rotatable in a direction of rotation, said mechanical seal including:

a. a gland means, nonrotatably attachable to said housing in a surrounding relationship to said shaft and having an annular inner flange extending radially inward toward said shaft, forming an annular space around said shaft, said inner flange having an annular inner surface facing said shaft, said gland means further having an inlet opening extending through said gland means and said annular inner flange to said annular space at an intersection with said annular inner surface, and an outlet opening extending through said gland means and said annular inner flange to said annular space at an intersection with said annular inner space;

b. an annular stationary seal means having an inboard stationary seal face, said inboard stationary seal means positionable around said shaft axially adjacent to and axially supported by said inner flange and in a nonrotatable relationship with respect to said housing;

c. an inboard annular rotary seal means having an inboard rotary seal face slidably and sealingly engageable with said inboard stationary seal face, said inboard rotary seal means nonrotatably connected to a rotary sleeve;

d. an outboard annular stationary seal means having an outboard stationary seal face, said outboard stationary seal means positionable around said shaft axially adjacent to and axially supported by said inner flange on the opposite side of said inner flange from said inboard annular stationary seal means and in a nonrotatable relationship with respect to said housing;

e. an outboard annular rotary seal means having an outboard rotary seal face slidably and sealingly engageable with said outboard stationary seal face, said outboard rotary seal means nonrotatably connected to a rotary sleeve; and f. a rotary sleeve having an outer surface, nonrotatably attachable around said shaft and extending between said inboard rotary seal means and said shaft, between said inboard stationary seal means and said shaft, between said flange and said shaft, between said outboard stationary seal means and said shaft and between said outboard rotary seal means and said shaft;

an improvement wherein said annular flange is provided with a plurality of notches having centers and extending radially outward from said inner surface, said notches being circumferentially spaced on that portion of said flange beginning at said outlet opening, continuing in said direction of rotation of said shaft, and ending at said inlet opening.

30. A mechanical seal according to claim 29, wherein one said notch is located substantially adjacent to said outlet opening and another said notch is located substantially adjacent to said inlet opening.

31. A mechanical seal according to claim 30, wherein a plurality of interior notches are provided between said notch adjacent to said outlet opening and said notch adjacent to said inlet opening.

32. A mechanical seal according to claim 31, wherein said notch adjacent to said outlet opening has a depth approximately equal to three times a perpendicular distance between said flange and said sleeve, and said notch adjacent to said inlet opening has a depth approximately equal to five times said distance between said flange and said sleeve.

33. A mechanical seal according to claim 32, wherein said interior notches each have a depth approximately equal to said perpendicular distance between said flange and said sleeve.

34. A mechanical seal according to claim 31, wherein said notches are provided in a number such that said centers of said notches are spaced approximately fifteen degrees apart between said inlet opening and said outlet opening.

35. A mechanical seal according to claim 29, wherein said sleeve is provided with a plurality of axial notches, each extending from beneath said inboard stationary seal means to beneath said outboard stationary seal means.

36. A mechanical seal according to claim 35, wherein each said axial notch is provided with a sloping bottom, sloping from a desired maximum depth of said notch radially outward to said outer surface of said sleeve.

37. A mechanical seal according to claim 36, wherein said bottom slopes from said desired maximum depth of said notch to said outer surface of said sleeve in said direction of rotation of said shaft.

38. A mechanical seal according to claim 31, wherein said sleeve is provided with a plurality of axial notches, each extending from beneath said inboard stationary seal means to beneath said outboard stationary seal means.

39. A mechanical seal according to claim 38, wherein each said axial notch is provided with a sloping bottom, sloping from a desired maximum depth of said notch radially to said outer surface of said sleeve.

40. A mechanical seal according to claim 39, wherein said bottom slopes from said desired maximum depth of said notch to said outer surface of said sleeve in said direction of rotation of said shaft.

41. A mechanical seal according to claim 29, wherein said sleeve is provided with a plurality of axial notches positioned beneath said outboard stationary seal means and a plurality of axial notches positioned beneath said inboard stationary seal means.

42. A mechanical seal according to claim 41, wherein each said axial notch is provided with a sloping bottom, sloping from a desired maximum depth of said notch radially outward to said outer surface of said sleeve.

43. A mechanical seal according to claim 42, wherein said bottom slopes from said desired maximum depth of said notch to said outer surface of said sleeve in said direction of rotation of said shaft.

44. A mechanical seal according to claim 29, wherein a recess is provided in said annular inner surface at said intersection of said annular inner surface and said outlet opening, said recess extending from said outlet opening in a direction opposite said direction of rotation.

45. A mechanical seal according to claim 44, wherein said recess is formed such that said annular inner surface slopes into said recess toward said outlet opening in said direction of rotation of said shaft.

46. A mechanical seal according to claim 44, wherein a recess is provided in said annular inner surface at said intersection of said annular inner surface and said inlet opening, said recess in said annular inner surface at said intersection of said annular inner surface and said inlet opening extending from said inlet opening in said direction of rotation.

47. In a mechanical seal for providing a seal between a housing and a shaft rotatable in a direction of rotation, said mechanical seal including:

a. a gland means, nonrotatably attachable to said housing in a surrounding relationship to said shaft and having an annular inner flange extending radially inward toward said shaft, forming an annular space around said shaft, said inner flange having an annular inner surface facing said shaft, said gland means further having an inlet opening extending through said gland means and said annular inner flange to said annular space at an intersection with said annular inner surface, and an outlet opening extending through said gland means and said annular inner flange to said annular space at an intersection with said annular inner space;

b. an inboard annular stationary seal means having an inboard stationary seal face, said inboard stationary seal means positionable around said shaft axially adjacent to and axially supported by said inner flange and in a nonrotatable relationship with respect to said housing;

c. an inboard annular rotary seal means having an inboard rotary seal face slidably and sealingly engageable with said inboard stationary seal face, said inboard rotary seal means nonrotatably connected to a rotary sleeve;

d. an outboard annular stationary seal means having an outboard stationary seal face, said outboard stationary seal means positionable around said shaft axially adjacent to and axially supported by said inner flange on the opposite side of said inner flange from said inboard annular stationary seal means and in a nonrotatable relationship with respect to said housing;

e. an outboard annular rotary seal means having an outboard rotary seal face slidably and sealingly engageable with said outboard stationary seal face, said outboard rotary seal means nonrotatably connected to a rotary sleeve; and f. a rotary sleeve having an outer surface, nonrotatably attachable around said shaft and extending between said inboard rotary seal means and said shaft, between said inboard stationary seal means and said shaft, between said flange and said shaft, between said outboard stationary seal means and said shaft and between said outboard rotary seal means and said shaft;

an improvement wherein said sleeve is provided with a plurality of axial notches positioned between said inboard stationary seal means and said shaft and a plurality of axial notches positioned between said outboard stationary seal means and said shaft, wherein each said axial notch is provided with a sloping bottom, sloping from a desired maximum depth of said notch radially outward to said outer surface of said sleeve, and wherein said bottom slopes from said desired maximum depth of said notch to said outer surface of said sleeve in said direction of rotation of said shaft.

48. In a mechanical seal for providing a seal between a housing and a shaft rotatable in a direction of rotation, said mechanical seal including:

a. a gland means, nonrotatably attachable to said housing in a surrounding relationship to said shaft and having an annular inner flange extending radially inward toward said shaft, forming an annular space around said shaft, said inner flange having an annular inner surface facing said shaft, said gland means further having an inlet opening extending through said gland means and said annular inner flange to said annular space at an intersection with said annular inner surface, and an outlet opening extending through said gland means and said annular inner flange to said annular space at an intersection with said annular inner space;

b. an inboard annular stationary seal means having an inboard stationary seal face, said inboard stationary seal means positionable around said shaft axially adjacent to and axially supported by said inner flange and in a nonrotatable relationship with respect to said housing;

c. an inboard annular rotary seal means having an inboard rotary seal face slidably and sealingly engageable with said inboard stationary seal face, said inboard rotary seal means nonrotatably connected to a rotary sleeve;

d. an outboard annular stationary seal means having an outboard stationary seal face, said outboard stationary seal means positionable around said shaft axially adjacent to and axially supported by said inner flange on the opposite side of said inner flange from said inboard annular stationary seal means and in a nonrotatable relationship with respect to said housing;

e. an outboard annular rotary seal means having an outboard rotary seal face slidably and sealingly engageable with said outboard stationary seal face, said outboard rotary seal means nonrotatably connected to a rotary sleeve; and f. a rotary sleeve having an outer surface, nonrotatably attachable around said shaft and extending between said inboard rotary seal means and said shaft, between said inboard stationary seal means and said shaft, between said flange and said shaft, between said outboard stationary seal means and said shaft and between said outboard rotary seal means and said shaft;

an improvement wherein said sleeve is provided with a plurality of axial notches positioned between said inboard stationary seal means and said shaft and a plurality of axial notches positioned between said outboard stationary seal means and said shaft, and wherein a recess is provided in said annular inner surface at said intersection of said annular inner surface and said outlet opening, said recess extending from said outlet opening in a direction opposite said direction of rotation.

49. A mechanical seal according to claim 48, wherein said recess is formed such that said annular inner surface slopes into said recess toward said outlet opening in said direction of rotation of said shaft.

50. A mechanical seal according to claim 49, wherein a recess is provided in said annular inner surface at said intersection of said annular inner surface and said inlet opening, said recess in said annular inner surface at said intersection of said annular inner surface and said inlet opening being positioned in said direction of rotation from said inlet opening.

51. A mechanical seal according to claim 48, wherein said axial notches each extend from beneath said stationary seal means to beneath said flange.

52. A mechanical seal according to claim 51, wherein each said axial notch is provided with a sloping bottom, sloping from a desired maximum depth of said notch radially outward to said surface of said sleeve.

53. A mechanical seal according to claim 52, wherein said bottom slopes from said desired maximum depth of said notch to said outer surface of said sleeve in said direction of rotation of said shaft.

54. A mechanical seal according to claim 53, wherein a recess is provided in said annular inner surface at said intersection of said annular inner surface and said outlet opening.

55. A mechanical seal according to claim 54, wherein said recess is formed such that said annular inner surface slopes into said recess toward said outlet opening in said direction of rotation of said shaft.

56. A mechanical seal according to claim 54, wherein a recess is provided in said annular inner surface at said intersection of said annular inner surface and said inlet opening.

* * * * *